Aug. 23, 1966   J. G. KAY   3,268,115
WORKPIECE ESCAPEMENT FOR RUNWAYS
Filed July 15, 1964   3 Sheets-Sheet 1
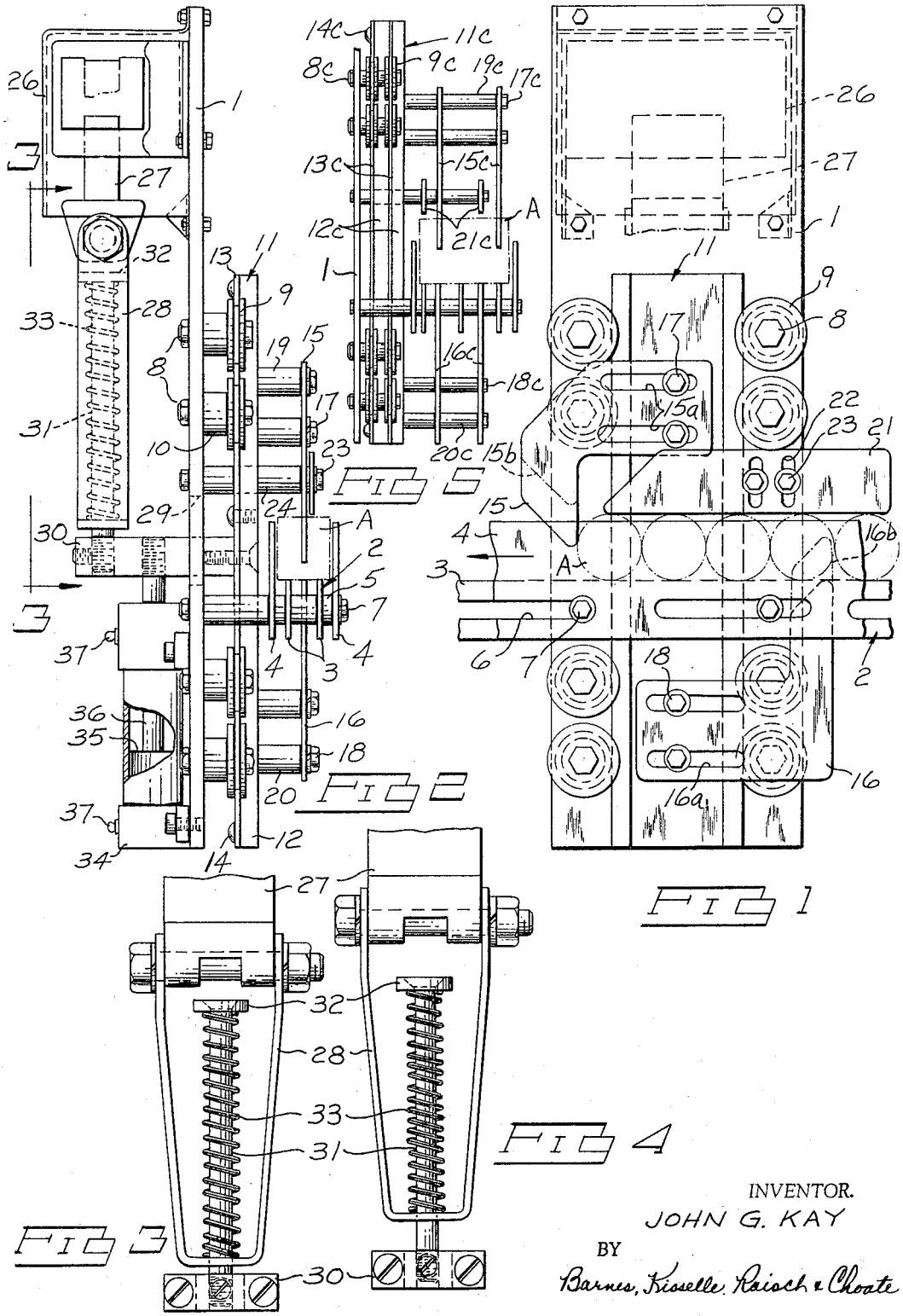

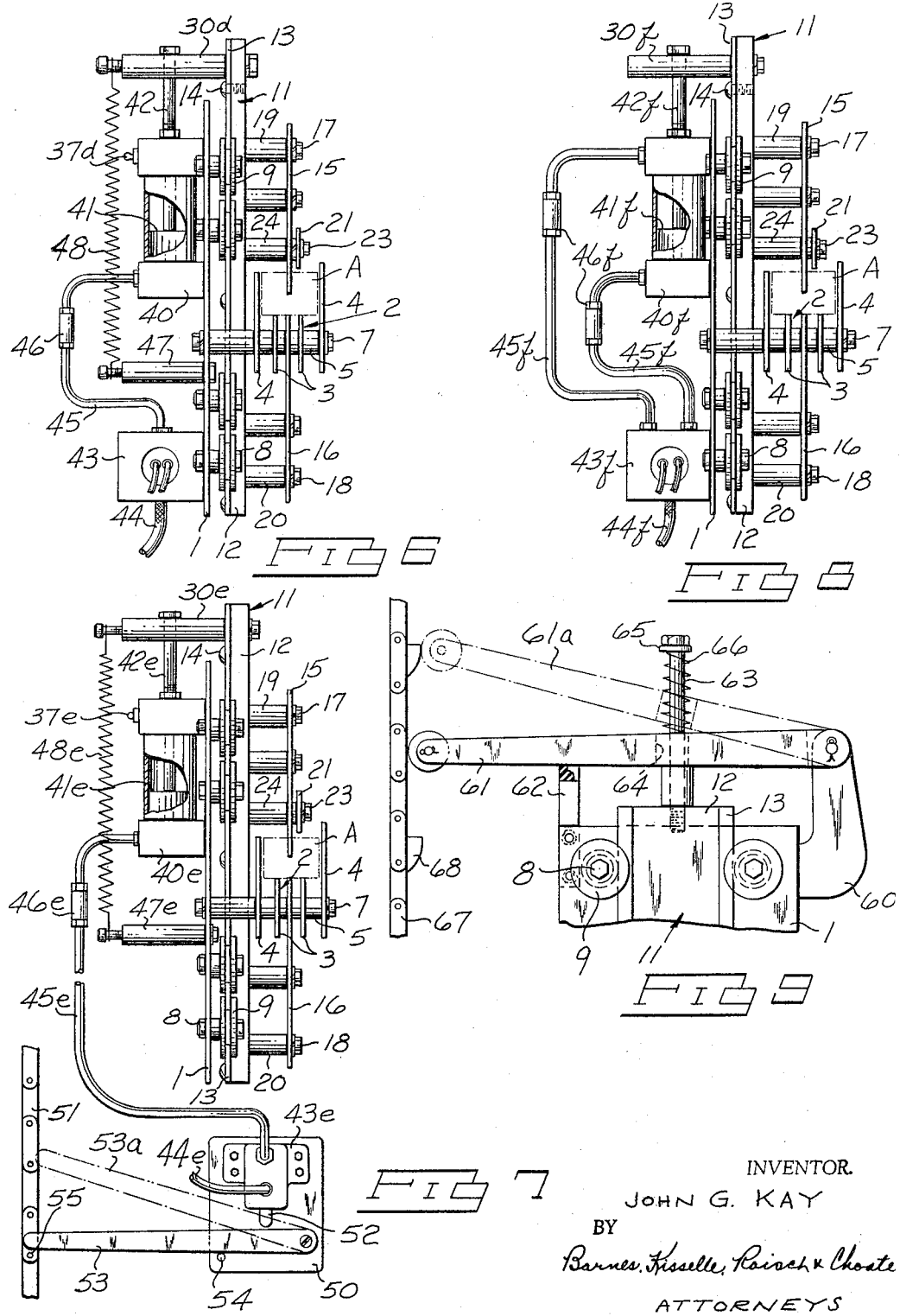

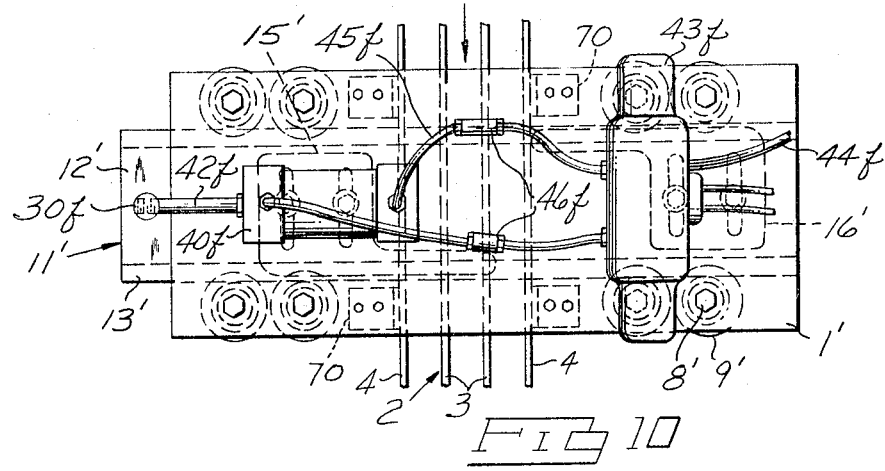
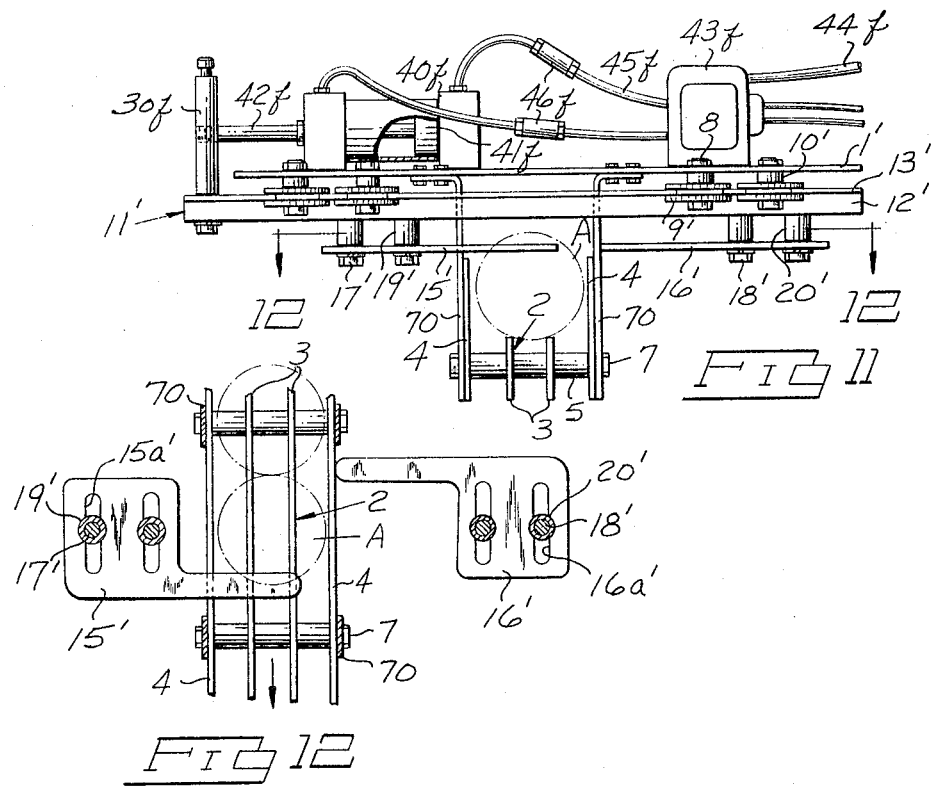

United States Patent Office 3,268,115
Patented August 23, 1966

3,268,115
WORKPIECE ESCAPEMENT FOR RUNWAYS
John G. Kay, Detroit, Mich., assignor to F. Jos. Lamb Company, Warren, Mich., a corporation of Michigan
Filed July 15, 1964, Ser. No. 382,793
10 Claims. (Cl. 221—15)

This invention relates to improvements in escapements and more particularly to a workpiece escapement adapted to be mounted on a runway for workpieces. It is an object of the invention to provide an escapement including a backplate having a slide mounted for straight line reciprocation thereon and dogs so mounted on the slide that as the latter travels from one end of its stroke to the other one dog is moved into position to obstruct the passage of workpieces at one location along a runway and the other is moved from its workpiece obstructing position at another location along the runway.

Some of the objects of the invention are to provide an escapement wherein the spacing between the dogs is longitudinally adjustable to permit entry of either one or a plurality of workpieces between the dogs; wherein if the direction of travel of workpieces along the runway is to be reversed the dogs may be removed from the slide, turned through 180 degrees and their positions on the slide reversed; wherein a plurality of transversely opposed dogs may be mounted on the slide to halt long workpieces extending transversely of the runway at right angles to their path of travel at each location at which they are to be stopped; or wherein opposed sets of dogs on a single slide may be employed to control the flow of workpieces along adjacent parallel runways; and wherein the mounting for the slide may consist of opposed rows of peripherally grooved rollers projecting laterally from the said plate to engage the opposed lateral margins of the slide.

Another object of the invention is to provide an escapement including a backplate on one side of which a slide having dogs secured thereon is mounted for reciprocation, and on the opposite side of which means are provided for reciprocating the slide.

A further object of the invention is to provide an escapement which permits stoppage of the slide at any point along its travel if a workpiece obstructs continued movement of one of the dogs.

A further object of the invention is to provide an economical and efficient construction for the reciprocating slide of the escapement.

Still another object of the invention is to provide means for controlling the speed of reciprocation of the slide so that the escapement dogs engage the workpieces smoothly rather than abruptly.

With these and other objects and advantages in view, the invention is hereinafter more fully described with the aid of the accompanying drawings, in which:

FIGURE 1 is a front elevation of the invention with the slide and its dogs in their down position.

FIGURE 2 is a side elevation thereof, and

FIGURE 3 is a view on the line 3—3 of FIGURE 2.

FIGURE 4 is a view similar to FIGURE 3 but with parts in the position they assume as the solenoid plunger is raised.

FIGURE 5 shows a slight modification of the slide and the arrangemnt of the dogs.

FIGURES 6, 7 and 8 each show a different modification of the means for reciprocating the slide, and FIGURE 9 is a front elevation showing yet another means for reciprocating the slide.

FIGURE 10 is a plan view showing another modification wherein the slide and the dogs are mounted for reciprocation in a horizontal plane.

FIGURE 11 is a side elevation of FIGURE 10, and

FIGURE 12 is a section on the line 12—12 of FIGURE 11.

Referring first to FIGURES 1 to 4 inclusive, 1 designates a vertical backplate adapted to be mounted at right angles to the path of movement of workpieces A along a runway 2. The runway shown is of the type wherein carrier rails 3 for the workpieces are uniformly spaced between guide rails 4 by spacers 5. Bolts 7 extend through spacers 5 and through elongated slots 6 formed through rails 3, 4 to retain the rails in alignment. Some of the bolts 7 in this instance also extend through the backplate 1 and hold the latter in position. Projecting laterally through the backplate towards the runway are two vertical rows of bolts 8 on each of which a roller 9 having a groove formed around its periphery is mounted for rotation, and an annular spacer 10 is interposed between the backplate and each roller. 11 denotes a slide consisting in the present instance of a tapping plate 12 to the face of which adjacent the backplate a gib plate 13 is secured as by screws 14. The lateral margins of the gib plate project outwardly beyond the sides of the tapping plate and are engaged by the grooved rollers 9 between opposed pairs of which the slide is thus mounted for straight line reciprocation.

As is illustrated in the drawings, the tapping plate 12 is formed from a relatively heavy section, for example a piece of cold rolled steel about a ¼" thick. This not only imparts weight to the slide but also provides a member sufficiently thick and rigid to retain screws. On the other hand the gib plate is a relatively thin member, preferably formed from a strip of spring steel. Gib plate 13 thus possesses good wearing qualities for rollers 9 and presents a minimum of friction for the rollers.

Upper and lower dogs 15 and 16 are horizontally slotted at 15a and 16a through which cap screws 17 and 18, respectively, extend and are in threaded engagement with the tapping plate 12; and mounted on the cap screws 17 and 18 between the tapping plate and the dogs 15 and 16 are spacers 19 and 20, respectively. The slots 15a and 16a permit longitudinal adjustment of the dogs relative to one another so that their spacing may be regulated to suit the number and size of the workpieces A to be admitted and discharged from between them when slide 11 is reciprocated. A vertically adjustable retainer 21 is provided with vertical slots 22 for the passage of bolts 23 therethrough by which it is secured to the backplate; and mounted on the bolts are spacers 24 which hold the retainer so positioned that it extends parallel with and adjacent to one side of the dog 15. The retainer is positioned just above the workpieces to prevent their upward displacement by an inwardly moving dog. To insure easy engagement of cylindrical workpieces, as shown at A in FIGURES 1 and 2, by the dogs, the side of the workpiece engaging extremity of each dog facing approaching workpieces extends at right angles to the runway and the opposite side of each dog is outwardly tapered from said extremity. If the direction of flow of workpieces on the runway is to be reversed the dogs are removed from the slide and their positions exchanged so that the dog 15 is secured to the slide by the screws 18 and the dog 16 by the screws 17.

Vertically mounted on the opposite side of the backplate 1 to the side 11 is a single-acting solenoid 26 with its plunger 27 projecting downwardly. FIGURES 2 and 3 show the plunger in its bottom position upwardly from which it is raised by solenoid action, while its downward movement is effected by its own weight together with that of the slide 11 to which it is connected by means hereinafter described. Mounted on the lower extremity of the plunger 27 is a depending yoke 28 closed at its lower extremity. Secured to the slide 11 intermediately of its height and extending through a vertical slot 29 formed through the backplate 1 is an arm 30 which terminates beneath the lower closed extremity of the yoke 28. Secured at its lower extremity to the arm 30 and extending for vertical movement through an opening formed through the closed extremity of the yoke is a spindle 31 which terminates at its upper extremity in an enlarged head 32 beneath the plunger 27. 33 denotes a helical spring arranged around the spindle between the enlarged head thereon and the yoke. Mounted also on the same side of the backplate 1 as the solenoid 26 and beneath the arm 30 is an air cylinder 34 having a piston 35 therein upwardly from which a rod 36 projects and is secured at its outer extremity to the arm 30. Mounted in the cylinder adjacent each extremity is a bleeder valve 37 so that as the piston rod is moved in either direction a dashpot-like effect is created and air flows relatively slowly out of one end of the cylinder and into the other through valves 37 to retard the movement of the piston and its rod.

When the solenoid 26 is energized it immediately raises the plunger 27 and the yoke 28 from their bottom positions shown in FIGURES 2 and 3 and compresses the spring 33 as shown in FIGURE 4. Due to the restricted air flow permitted through the bleeder valves 37 the spring moves the arm 30 and the slide 11 slowly to their raised positions and the dogs gradually assume their positions indicated at 15b and 16b respectively in FIGURE 1, relative to the runway 2. The solenoid is set to retain the plunger in its raised position for a predetermined time interval by means of a suitable timer or any other means for energizing solenoid 26 periodically for a predetermined time interval after which the plunger and the slide drop of their own weight; but the downward movement of the slide is retarded by the action of the bleeder valves 37.

From the foregoing it will be seen that in spite of the rapid movement imparted by the solenoid to its plunger the dogs are not only moved at materially slower speed, but this arrangement also permits the slide to be stopped at any point along its travel in either direction if completion of the movement of either dog is obstructed. The slow gradual movement of the dogs is desirable to prevent constant and rapid impact of the workpieces against one another with consequent damage thereto and the liability to be jarred out of the runway. The retarded movement of the dogs also eliminates wear and prolongs their life.

In the modification shown in FIGURE 5 the difference lies in the provision of a plurality of transversely aligned dogs 15c and 16c separated by additional spacers 19c and 20c on the cap screws 17c and 18c extending from the backplate, to retain long cylindrical workpieces when halted at right angles to the runway, and 21c denotes spaced aligned retainers. In order to afford greater rigidity to the slide 11c and latter consists of a plurality of gib plates 13c and tapping plates 12c alternately arranged and secured to one another by screws 14c; and mounted on each bolt 8c secured to the backplate 1 are coaxially grooved rollers 9c so spaced from one another that one roller on each bolt engages each gib plate 13c. It will be also noted that due to the increased length of engagement of the cap screws 17c and 18c with the tapping plates as well as at least one gib plate greater rigidity is afforded to the dogs.

In the modification shown in FIGURES 6 to 9 inclusive the construction of the slide and the dogs thereon and the mounting of the slide is the same as that shown in FIGURES 1 to 4; the difference lies in the means for reciprocating the slide.

Referring to the modification shown in FIGURE 6, mounted on the reverse side of the backplate 1 to the slide 11 is a single-acting cylinder 40 having a piston 41 mounted therein from which a piston rod 42 projects upwardly. One extremity of an arm 30d is secured to the slide 11 and adjacent its opposite extremity the arm is secured to the rod 42 so that reciprocation of the latter imparts like movement to the slide. Mounted also on the backplate 1 is an electrically operated, timer controlled valve 43 having a compressed air supply line 44 and a feed line 45 connected thereto. The opposite extremity of the feed line is connected to the lower extremity of the cylinder 40. The valve 43, being timer controlled, is set to open and remain open for a predetermined time and then close and remain closed for a predetermined period before reopening. A flow control valve 46 is provided in the feed line 45, and mounted in the cylinder adjacent its upper extremity is a bleeder valve 37d. Projecting from the backplate beneath the cylinder 40 is a post 47, and secured at one extremity to the latter and at its opposite extremity to the arm 30d is a helical spring 48. The flow control valve 46 regulates the flow of compressed air to the cylinder and thus the speed of upward movement of the piston rod 42 and the slide 11, and the bleeder valve 37d retards the downward movement of the piston which is mainly caused by the action of the spring 48.

In the modification shown in FIGURE 7 the arrangement is the same as that shown in FIGURE 6 except that the valve 43a is mechanically operated. The valve is mounted on a supporting plate 50 positioned adjacent to vertically moving endless chain 51 which forms part of an automated system in which the escapement is included. Pivotally mounted on the supporting plate beneath a downwardly spring urged operating handle 52 extending from the valve 43e is a pivot arm 53 which is prevented from turning downwardly about its axis beyond a substantially horizontal position by a stop 54 projecting from the said plate. Extending laterally from the chain 51 at spaced intervals are pins 55 each of which lifts the pivot arm 53 to its position 53a in turn thereby raising the handle 52 and opening the valve. When the pivot arm reaches its raised position it drops off the pin back onto the stop 54 and the valve is again closed. Both a compressed air supply line 44e and a feed line 45e are connected to the valve 43e; a flow control valve 46e is provided in the feed line which is connected to the lower end of the cylinder 40e; and a bleeder valve 37e is mounted in the cylinder adjacent its upper extremity. An arm 30e connects a piston rod 42e which projects upwardly from a piston 41e in the cylinder with the slide 11, and a helical spring 48e is secured at one extremity to the arm 30e and at its opposite extremity to a post 47e projecting from the backplate 1. Thus the piston and the slide are again moved upwardly by air pressure and downwardly mainly by the weight of the said slide and the action of the spring 48e, but at all events the slide moves vertically at a speed substantially less than its free gravitational speed. This is particularly important when the slide is moving upwardly. If the slide moves upwardly too rapidly, the lower dog will have a tendency to cause the workpieces just ahead of it to shoot forwardly and/or pop out of the runway as distinguished from merely being released for forward movement.

In the modifications shown in FIGURE 8 and also in FIGURES 10 to 12 the means for reciprocating the slide is the same though in FIGURE 8 the backplate 1 and the slide 11 are vertical whereas in FIGURES 10 to 12 the backplate 1' and the slide 11' are horizontal. A double acting cylinder 40f is secured to the backplate 1 or 1' and has a piston 41f therein from which a piston rod 42f projects. The rod 42f is connected by a laterally projecting arm 30f to the slide 11 or 11' to reciprocate the latter. A fluid pressure supply line 44f is connected to a four-way electrically operated, timer controlled valve 43f mounted on the backplate, and extending from the said valve are separate feed lines 45f each connected to one extremity of the cylinder 40f so that air under pressure flows to each end of the cylinder alternately for a predetermined time. While the valve 43f shown in FIGURE 8 is somewhat differently shaped from that shown in FIGURES 10 and 11 their operation is the same in both cases. A flow control valve 46f is provided in each feed line to control the speed of movement of the piston in each direction. It will be noted that should movement of the slide in either direction be obstructed that the latter would merely stop and in due course resume its movement but in the opposite direction, since only relatively low pressure air is utilized.

In the modification shown in FIGURE 9 a bracket 60 projects upwardly from one side of the backplate 1 and has an arm 61 pivotally mounted thereon. This arm extends across and above the slide 11, and extending upwardly from the top of the backplate preferably on the side of the latter remote from the bracket is a stop 62 which normally supports the arm in a substantially horizontal position. Secured to the top of the slide centrally of its width and projecting upwardly therefrom is a pin 63 which projects through an elongated slot 64 formed through the arm intermediately of its length. Formed at the upper extremity of the pin is an enlarged head 65 between which and the upper face of the arm 61 a helical spring 66 is mounted around the pin. The strength of the spring is such that it only contracts materially if upward movement of the arm continues when corresponding movement of the slide is prevented. The arm 61 is adapted to be moved upwardly as by spaced trips 68 mounted on a vertically movable endless chain 67. When the arm reaches its postion indicated at 61a the slide 11 is in its fully raised position, the arm then drops off the trip back onto the stop 62 and the slide returns to its bottom position. Chain 67, which for example may be the driving chain for a workpiece elevator used in conjunction with the runway, travels at a speed such that the upward stroke of the slide is sufficiently slow to produce the smooth action of the work engaging dogs.

Referring again to FIGURES 10 to 12, secured to the outer faces of the guide rails 4 by adjacent bolts 7, which together with the spacers 5 hold the guide rails and the carrier rails 3 in uniformly spaced relation, are upwardly projecting angle brackets 70 which support the backplate 1'. The latter as previously stated, is horizontal in this instance and extends at right angles to and over the runway 2. Bolts 8' having spacer 10' thereon extending vertically downward from the backplate 1' and support grooved rollers 9' for rotation. The slide 11' is also horizontal and consists of a gib plate 13' to the underside of which a tapping plate 12' is suitably secured. Opposed lateral margins of the gib plate 13' are engaged by the grooved rollers 9' which support the slide for reciprocation at a right angle to and over the runway. Dogs 15' and 16' are dependingly secured to the tapping plate 12' by cap screws 17' and 18' which pass through elongated slots 15a' and 16a' in the dogs and through spacers 19' and 20', respectively. The spacers 19' and 20' insure that the dogs are so positioned that when the slide moves the dogs pass freely just over the guide rails 4. It will also be noted that in this case the underside of the slide functions as a retainer to prevent the escape of workpieces from the runway when one is suddenly halted by one of the dogs.

It will be appreciated that while two dogs are illustrated in all of the embodiments of the invention described only one dog, preferably the upper dog 15, is necessary in the event the device is utilized merely for controlling the flow of workpieces in a runway. When one dog is utilized, it operates in the manner of a shot bolt to arrest flow of workpieces in the runway until it is retracted.

I claim:

1. An escapement including a backplate adapted to be mounted vertically in fixed relation to a runway along which workpieces are adapted to travel, a slide mounted for vertical reciprocation on one side of the backplate, a dog mounted on the slide to halt workpieces at one point along the runway when said slide reaches one end of its travel, another dog mounted on the slide to halt workpieces at another point along the runway when said slide reaches the other end of its travel, a single-acting solenoid including timer control means for energizing it at spaced intervals secured to the other side of the backplate, a plunger mounted for vertical movement in the solenoid, said solenoid when energized being adapted to raise the plunger from its bottom to its top position and hold it there for a predetermined time until the solenoid is de-energized and the plunger drops to its bottom position where it remains until the solenoid is again energized, a yoke depending from the plunger having its underside closed, an arm secured to the slide, projecting through an opening formed through the backplate and terminating beneath the yoke, a spindle secured to the arm, projecting upwardly through an opening formed through the yoke and terminating at its upper extremity beneath the plunger in an enlarged head, a helical spring around the spindle between the yoke and the head, and said spring being compressed upon upward movement of the plunger and yoke whereupon the spring raises the arm and slide.

2. The combination in claim 1, including means for retarding the movement of the arm and slide when the plunger and yoke are moved in either direction.

3. An escapement including a backplate adapted to be mounted in fixed relation to a runway along which workpieces travel, a slide mounted for straight line reciprocation on the backplate, dogs mounted on the slide for reciprocation therewith, one dog being positioned to halt workpieces at one point along the runway when said slide reaches one end of its travel and the other dog being positioned to halt workpieces at another point along the runway when the slide reaches the opposite end of its travel, and means mounted in fixed relation on the backplate for intermittently reciprocating the slide, said means for reciprocating the slide including a solenoid mounted in fixed relation to the backplate, a plunger mounted for vertical movement by the solenoid, a yoke extending from one extremity of the plunger parallel with the path of movement thereof, said yoke being closed at its extremity remote from the plunger, an arm secured to the slide and projecting across the path of movement of the yoke but beyond said yoke at all positions of the plunger, a spindle secured to the arm, projecting through an opening formed through the closed end of the yoke and terminating in an enlarged head, and a helical spring around the spindle between the head and the yoke whereby upon movement of the plunger in one direction the spring is compressed and raises the arm and slide.

4. The combination in claim 3, including means for retarding the action of the spring and the movement of the arm and slide.

5. The combination in claim 3, including a cylinder mounted in fixed relation to the solenoid and beneath the arm, a piston mounted in the cylinder having a rod projecting therefrom and secured to said arm, and bleeder valves mounted in opposite extremities of the cylinder.

6. An escapement including a backplate adapted to be mounted in fixed relation to a runway along which workpieces travel, a slide mounted for straight line reciprocation on the backplate, dogs mounted on the slide for reciprocation therewith, one dog being positioned to halt workpieces at one point along the runway when said slide reaches one end of its travel and the other dog being positioned to halt workpieces at another point along the runway when the slide reaches the opposite end of its travel, and means mounted in fixed relation on the backplate for intermittently reciprocating the slide, said means for reciprocating the slide including a cylinder mounted on the backplate and having a piston therein, a piston rod projecting from the piston, means connecting the piston rod to the slide whereby they move as a unit, a timer controlled electrically operated valve to which a fluid pressure supply line is adapted to be connected, a separate feed line connecting said valve to each end of the cylinder, a flow control valve in each feed line, and said electrically operated valve being adapted to connect each feed line alternately with the fluid pressure supply line for a predetermined time.

7. In combination, a runway along which workpieces are adapted to travel, a backplate fixedly mounted on the runway in a position offset from the path of travel of the workpieces in the runway, a slide mounted on the backplate for reciprocation in a straight line transversely of the runway and offset therefrom, a pair of dogs fixedly mounted on the slide and offset from the plane thereof to project into the path of travel of the workpieces in the runway when the slide is reciprocated, one dog being positioned on the slide at one side of the runway to halt workpieces at one point along the runway when the slide reaches one end of its stroke and the other dog being positioned on the opposite side of the runway to halt workpieces at another point along the runway when the slide reaches the opposite end of its stroke, said dogs being adjustable on the slide lengthwise of the runway, and means mounted on the backplate for intermittently reciprocating the slide.

8. The combination called for in claim 7 wherein said slide comprises a relatively thin sheet metal strip possessing good wearing qualities and having parallel side edges and a substantially heavier plate mounted on said strip with its side edges spaced inwardly of the side edges of the strip and including means mounted on said backplate engaging and overlapping the side edges of the strip to restrict movement of the latter to straight line reciprocation in a plane parallel to the plane of the backplate, said dogs being mounted on said slide by screws anchored on the heavier plate.

9. The combination called for in claim 8 wherein said means engaging the edges of said strip comprises two rows of circumferentially-grooved rollers journaled on the backplate and between which the slide is engaged.

10. The combination in claim 7, wherein the means for mounting the slide for reciprocation on the backplate includes two parallel rows of grooved rollers mounted on the backplate between which opposite margins of the slide are mounted.

References Cited by the Examiner
UNITED STATES PATENTS

| | | | |
|---|---|---|---|
| 319,684 | 6/1885 | Euston | 222—561 |
| 1,246,648 | 11/1917 | Peck | 221—296 |
| 1,596,366 | 8/1926 | Miller | 221—16 |
| 2,192,503 | 3/1940 | Newman | 221—299 |
| 2,544,165 | 3/1951 | Kransnow | 221—299 |
| 2,640,605 | 6/1953 | Chatterton | 221—16 |
| 2,725,160 | 11/1955 | Ahlstrom | 221—300 |
| 3,105,610 | 10/1963 | Aidlin et al. | 221—298 |
| 3,108,671 | 10/1963 | Fuka et al. | 193—40 |
| 3,133,670 | 5/1964 | Heyer | 221—296 |

M. HENSON WOOD, JR., *Primary Examiner*

WALTER SOBIN, *Examiner.*